United States Patent
Davis et al.

(10) Patent No.: US 12,385,663 B2
(45) Date of Patent: Aug. 12, 2025

(54) SYSTEM AND METHOD FOR AIR SANITIZATION

(71) Applicant: RESEARCH PRODUCTS CORPORATION, Madison, WI (US)

(72) Inventors: Pete Davis, Madison, WI (US); Gerald J. McNerney, Madison, WI (US); Thomas Anoszko, Madison, WI (US); Joseph Brandt, Madison, WI (US)

(73) Assignee: Research Products Corporation, Madison, WI (US)

( * ) Notice: Subject to any disclaimer, the term of this patent is extended or adjusted under 35 U.S.C. 154(b) by 490 days.

(21) Appl. No.: 17/864,923

(22) Filed: Jul. 14, 2022

(65) Prior Publication Data
US 2023/0014295 A1    Jan. 19, 2023

Related U.S. Application Data

(60) Provisional application No. 63/222,833, filed on Jul. 16, 2021.

(51) Int. Cl.
*F24F 11/77* (2018.01)
*F24F 8/20* (2021.01)
(Continued)

(52) U.S. Cl.
CPC ............... *F24F 11/77* (2018.01); *F24F 8/20* (2021.01); *F24F 2110/20* (2018.01); *F24F 2110/50* (2018.01); *F24F 2120/10* (2018.01)

(58) Field of Classification Search
CPC .......... F24F 11/77; F24F 2110/50; F24F 8/20; F24F 2110/10; F24F 2110/20;
(Continued)

(56) References Cited

U.S. PATENT DOCUMENTS

| | | | |
|---|---|---|---|
| 2006/0130663 A1* | 6/2006 | Joshi | B01D 53/007 422/186.2 |
| 2012/0253523 A1 | 10/2012 | Harrod et al. | |
| 2013/0260668 A1* | 10/2013 | Stakutis | F24F 11/74 454/256 |

(Continued)

FOREIGN PATENT DOCUMENTS

| | | |
|---|---|---|
| JP | 2009-219636 | 10/2009 |
| JP | 2010-019479 | 1/2010 |

(Continued)

OTHER PUBLICATIONS

Foreign Search Report on PCT DTD Nov. 10, 2022.

*Primary Examiner* — Chun Cao
(74) *Attorney, Agent, or Firm* — Foley & Lardner LLP

(57) ABSTRACT

A system and method for controlling air quality within an indoor space are disclosed. An example system includes an air circulation unit that moves air through ductwork of a heating, ventilation, and air conditioning (HVAC) system and an air sanitization unit within the ductwork of the HVAC system that sanitizes air passing through the ductwork of the HVAC system. The system further includes an indoor air quality controller that controls a rate at which the air circulation unit moves the air through the ductwork of the HVAC system responsive to inputs received at the indoor air quality controller and controls an operational status of the air sanitization unit responsive to the inputs received at the indoor air quality controller.

19 Claims, 3 Drawing Sheets

(51) Int. Cl.
  *F24F 110/20* (2018.01)
  *F24F 110/50* (2018.01)
  *F24F 120/10* (2018.01)
(58) Field of Classification Search
  CPC ............... F24F 2110/64; F24F 2110/66; F24F 2110/68; F24F 2110/70; F24F 2120/10; F24F 2120/14; F24F 3/16; F24F 8/10; F24F 8/167; F24F 8/192; F24F 8/22; F41B 15/04; G04B 47/00; G05B 19/042; G05B 2219/2614; G06F 16/35; G06F 16/374; G06F 16/38; G06Q 50/10; G06T 19/20; H04W 4/029; Y02B 30/70
  USPC .......................................................... 700/276
  See application file for complete search history.

(56) References Cited

U.S. PATENT DOCUMENTS

| | | | | |
|---|---|---|---|---|
| 2016/0061797 | A1* | 3/2016 | Kocher | F24F 11/50 |
| | | | | 702/24 |
| 2019/0234631 | A1* | 8/2019 | Wallace | B01L 1/04 |
| 2020/0240672 | A1* | 7/2020 | Patil | F24F 11/77 |
| 2022/0305438 | A1* | 9/2022 | Wenger | F24F 11/49 |
| 2022/0305881 | A1* | 9/2022 | Neu | B60H 1/00364 |

FOREIGN PATENT DOCUMENTS

| | | |
|---|---|---|
| KR | 1020180010747 | 1/2018 |
| KR | 102214731 | 2/2021 |
| WO | WO-2020/050864 A1 | 3/2020 |

* cited by examiner

SYSTEM AND METHOD FOR AIR SANITIZATION

CROSS-REFERENCE TO RELATED APPLICATIONS

The present application claims priority to U.S. Provisional Patent Application No. 63/222,833, filed Jul. 16, 2021, the entire contents of which are herein incorporated by reference in their entirety.

BACKGROUND

The present disclosure relates generally to systems and methods for sanitizing air within a structure. More specifically, the disclosure relates to coordinated control of an air sanitization component in a heating, ventilation, and air conditioning (HVAC) system.

HVAC systems are designed to regulate characteristics of indoor air to provide a comfortable and safe living environment within a structure. Such characteristics may include temperature, humidity, and a variety of air quality parameters. Current HVAC systems may incorporate one or more of a variety of components for regulating such characteristics including a furnace or other heating component, an air condition system or other cooling component, ventilation components, humidifiers, dehumidifiers, etc. Discussed in the present disclosures are various improved systems and methods for improving air quality and/or sanitizing air in coordination with other components and aspects of HVAC systems.

SUMMARY

According to one aspect of the present disclosure, a system for sanitizing air within an indoor space includes an air circulation unit that moves air through ductwork of a heating, ventilation, and air conditioning (HVAC) system and an air sanitization unit positioned to sanitize air within the ductwork of the HVAC system. The air sanitization unit sanitizes the air passing through the ductwork of the HVAC system. The system further includes an indoor air quality controller communicatively coupled to the air circulation unit and the air sanitization unit. The indoor air quality controller controls a rate at which the air circulation unit moves the air through the ductwork of the HVAC system responsive to one or more inputs received at the indoor air quality controller and controls an operational status of the air sanitization unit responsive to the one or more inputs received at the indoor air quality controller.

According to another aspect of the present disclosure, a method for controlling air quality within an indoor space is disclosed. The method includes receiving, by an indoor air quality controller, a selection of a sanitization mode and, in response to the selection of the sanitization mode, controlling, by the indoor air quality controller, a rate at which an air circulation unit moves air through ductwork of a heating, ventilation, and air conditioning (HVAC) system. The method further includes, in response to the selection of the sanitization mode, controlling, by the indoor air quality controller, an operational status of an air sanitization unit in conjunction with the controlled rate of the air through the ductwork, wherein the air sanitization unit is located within the ductwork of the HVAC system.

In another aspect of the present disclosure, a non-transitory computer-readable medium having instructions stored thereon that, upon execution by a computing device, cause the computing device to perform various operations including receiving a selection of a sanitization mode and, in response to the selection of the sanitization mode, controlling a rate at which an air circulation unit moves air through ductwork of a heating, ventilation, and air conditioning (HVAC) system and controlling an operational status of an air sanitization unit in conjunction with the controlled rate of the air through the ductwork, wherein the air sanitization unit is located within the ductwork of the HVAC system.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

Figure 1:
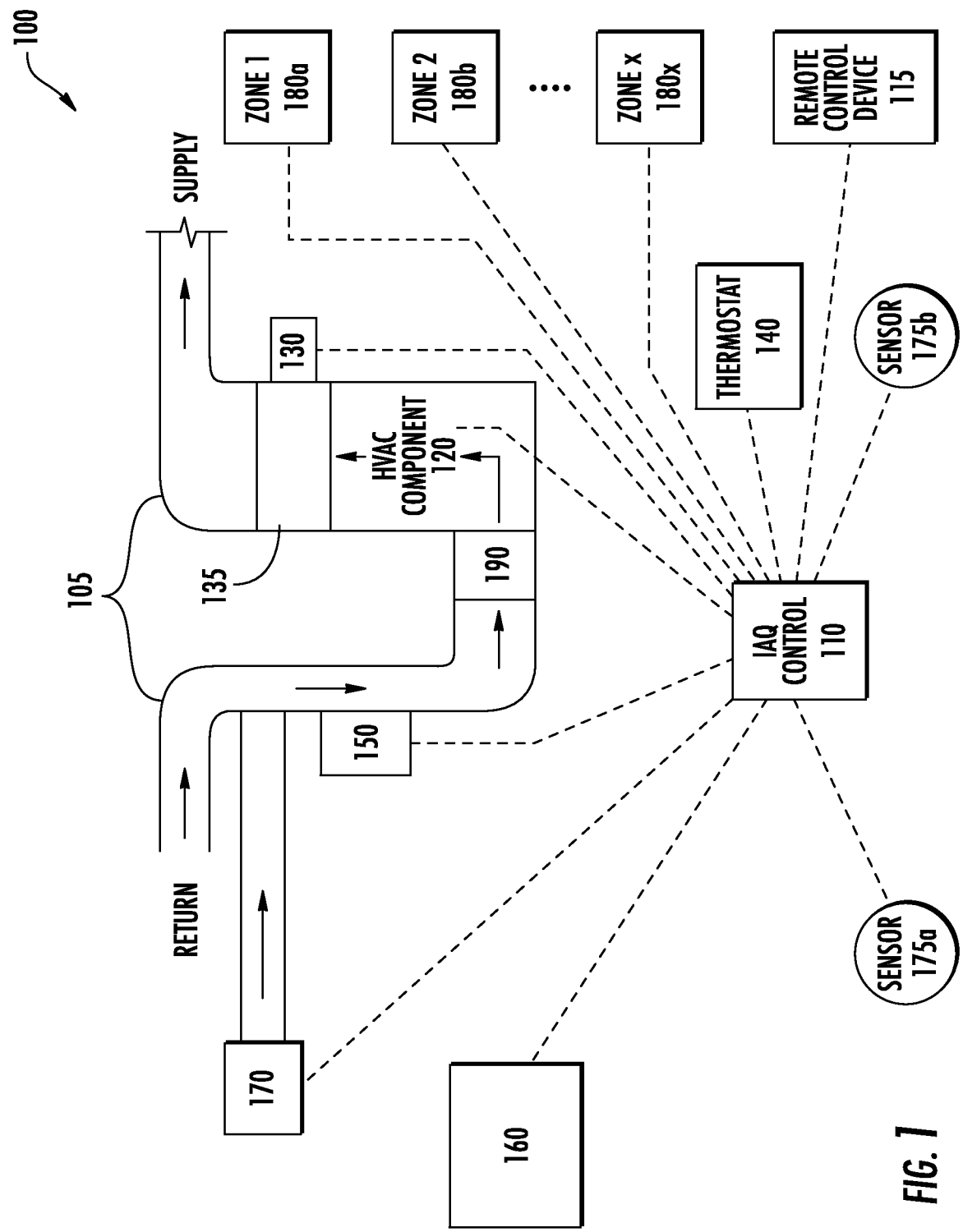
FIG. 1 is a block diagram illustrating an HVAC system, according to an exemplary embodiment.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Referring generally to the figures, an improved indoor air quality control system that provides enhanced air sanitization effectiveness and efficiency is disclosed. Traditional heating, ventilation, and air conditioning (HVAC) systems incorporate ductwork to carry treated air throughout the indoor space of a structure. Such HVAC systems often include one or more of a furnace, air conditioner, humidifier, dehumidifier, etc., to treat such air. Traditional sanitization devices such as ultraviolet-C lights have been used to disinfect surfaces. The present disclosure incorporates an air sanitization unit within the ductwork of an HVAC system and controls the operation of the air sanitization unit in coordination with an air circulation unit that moves air through the ductwork to effectively and efficiently sanitize air within an indoor space of a structure. The disclosure herein thus describes an improved air quality control system that optimizes the air sanitization-relevant parameters of the system and its components to provide increased sanitization effectiveness, increased control based on a variety of input variables and situations, and increased efficiency that maximizes energy savings and the lifespan of the system components.

Referring to FIG. 1, a schematic representation of an air quality control system 100 is shown, according to an exemplary embodiment. As shown, the air quality control system 100 includes an indoor air quality (IAQ) controller 110 configured to control one or more components of a heating, ventilation, and air conditioning (HVAC) system. The IAQ controller 110 may be an in-home control device, a remote control device such as a server device located on a cloud or as an app, or any other control device known to those in the art. The IAQ controller 110 may also be implemented in combination with other control devices (e.g., a control device that jointly controls multiple HVAC components including temperature, humidity, ventilation, etc.). The IAQ controller 110 is connected to an HVAC component 120 that includes an air circulation unit configured to selectively move air through ductwork 105. The HVAC component 120 may be a furnace, air conditioning unit, or other control unit designed to effect a characteristics of air within an indoor space. The air circulation unit may be a blower, fan, or other component configured to selectively move air through the ductwork.

The IAQ controller 110 is further connected to an air sanitization controller 130 that controls an air sanitization unit 135. The air sanitization unit 135 is located relative to the ductwork 105 such that it sanitizes the air moving through ductwork 105. In some aspects, the air sanitization unit 135 may be positioned partially or wholly within the ductwork 105. In various aspects, the air sanitization unit 135 may be positioned before or after (relative to the direction of airflow through the ductwork 105) an air handler unit (e.g., HVAC component 120). In additional aspects, the air sanitization unit 135 may be positioned adjacent the ductwork 105. The air sanitization unit 135 may include a light source or other component that disinfects or sanitizes air. In an embodiment, the air sanitization unit 135 may include one or more UV-C lamps or LEDs and optionally a reflective surface to maximize transmission of the light within a sanitization zone of the ductwork 105. As air passes through a sanitization zone within in the ductwork 105 UV-C light (or other sanitization media) from the air sanitization unit 135 is directed at and passes through the air, thereby sanitizing the air. In other embodiments, air sanitization unit 135 may additionally or separately include a photocatalytic oxidation (PCO) air sanitization device, an ionization air sanitization device, an adsorptive media sanitization device, or a mechanical or electronic filter.

The IAQ controller 110 is further connected to a humidifier 150 to selectively increase humidity of the air within the ductwork 105 and a dehumidifier 160 to selectively decrease humidity within the indoor space. The IAQ controller 110 is further operably coupled to and configured to control one or more ventilation dampers 170 to selectively provide outside air into the HVAC system and one or more zone dampers 180a, 180b, . . . 180x to selectively and independently control air quality within one or more zones (zone 1, zone 2, . . . zone x) of the indoor space. In alternative embodiments, power ventilators may be used in place of or in addition to the ventilation dampers 170. Control of one or more ventilation dampers 170 affords the IAQ controller 110 the ability to further remediate poor air quality conditions by introducing air from outside of the indoor space (e.g., ventilation air). Such control may be particularly beneficial in response to a determination of unusually poor air quality or air quality conditions that cannot be adequately addressed solely by air sanitization via the air sanitization unit 135. In some embodiments, the system may further include one or more ventilation air quality sensors to determine a state or quality of the ventilation air (e.g., outdoor air). Such air quality sensor may include outdoor sensors or sensors positioned in or relative to ventilation ductwork. They system may compare the state or quality of the ventilation air to a state or quality of indoor air and may utilize ventilation only in the event that the state or quality of the ventilation air is such that introduction of the ventilation air into the indoor space would improve the state or quality of the indoor air within the indoor space. In various embodiments, the IAQ controller 110 may be coupled to fewer or additional air quality control components.

Control determinations by the IAQ controller 110 may be made based on input data received from one or more sensors or control devices to which the IAQ controller 110 is connected including thermostat 140, sensors 175a, 175b, . . . 175x, remote control device 115, or other communicatively coupled components of the system. Sensors 175a, 175b, . . . 175x may include one or more of humidity sensors, temperature sensors, carbon dioxide sensors, motion sensors, volatile organic compound sensors, particulate sensors, radio sensors, etc. In some embodiments, one or more of these sensors may be incorporated as part of the IAQ controller 110 itself.

IAQ controller 110 coordinates control of the air sanitization unit 135 and the air circulation unit of the HVAC component 120 to enhance the effectiveness and efficiency of the sanitization of air within the indoor space. For example, based on one or more received inputs, the IAQ controller 110 controls an air flow rate produced by the air circulation unit and controls an operational status of the air sanitization unit 135 to optimize air sanitization. In an embodiment, the IAQ controller 110 receives an input from a user to implement a sanitization mode. Such an input may be received via a user interface presented on the IAQ controller 110 or via a user interface presented on a remote control device 115 (e.g., a network connected smartphone, thermostat, or other remote computing device) communicatively coupled to the IAQ controller 110. In response to selection of the sanitization mode input, the IAQ controller 110 issues a command to the air sanitization controller 130 to activate the air sanitization features of the air sanitization unit 135 (e.g., turn on the UV-C lights) and also controls the air circulation unit to cause circulation of air within the ductwork 105 at a rate commensurate with effective air sanitization. In an embodiment, the IAQ controller 110 causes the air circulation unit to move air at its lowest, non-zero setting so as to maximize the time at which the air is within an air sanitization zone affected by the air sanitization unit 135. For example, if a furnace has a blower fan with multiple speeds and/or stages, the IAQ controller 110 would cause the blower fan to operation at its lowest speed in response to selection of a sanitization mode (or corresponding alternative input) by a user.

In other embodiments, the flow rate of air through the ductwork may be decoupled or different from the flow rate of air through the air sanitization unit 135 such that the IAQ controller 110 may control the flow rate of air through the air sanitization unit 135 at a different rate than the flow rate of air through the primary ductwork 105. For example, the system could include a bypass damper loop that decreases a supply air flow rate to the air sanitization unit 135 but maintains a total air flow rate through the HVAC component 120.

In further embodiments, IAQ controller 110 may automatically trigger a sanitization mode based on various conditions within the indoor space. For example, IAQ controller 110 may receive sensor data from one or more air quality sensors 175a . . . x that sense one or more air quality parameters. Sensors 175a . . . x may include occupancy sensors (e.g., motion sensors, carbon dioxide sensors, light sensors, etc.), gas phase sensors (including volatile organic compound sensors), particulate sensors, etc. In response to determining that the sensor data is outside of an acceptable range, IAQ controller 110 may trigger the sanitization mode. For example, IAQ controller 110 may compare the received sensor data to a corresponding threshold or acceptable range to determine if the sanitization mode should be triggered. Such thresholds may be preprogrammed according to safety standards or recommended settings. In other embodiments, such thresholds may be user selectable or modifiable via selectable options presented on a graphical user interface of the IAQ controller 110 or other communicatively coupled control device. In other examples, IAQ controller 110 may use machine learning or artificial intelligence models to determine a pattern associated with data from one or more sensors exhibits a need for air sanitization.

IAQ controller 110 may also determine a sanitization run-time (e.g., a period of time for which the air sanitization unit 135 is operated) and control the air sanitization unit 135 and air circulation unit in accordance with the sanitization run-time. For example, IAQ controller 110 may calculate a period of time required to sufficiently sanitize the air within the indoor space of the structure. In an embodiment, IAQ controller 110 calculates the sanitization run-time based on a size of the indoor space and one or more air flow characteristics of the HVAC system. According to such an embodiment, IAQ controller 110 may receive a user input (or other input) indicating the size of the indoor space and may also receive an indication (or information from which such information may be derived) as to the flow rate (e.g., in cubic feet per minute) of the corresponding air circulation unit. In alternative embodiments, IAQ controller 110 may use additional and/or different factors in calculating the sanitization run time. For example, a filter type for an air cleaner 190 may be considered. A filter having a higher MERV rating or incorporating odor reducing materials including but limited to activated carbon or adsorptive media will require fewer air changes and a shorter sanitization run-time. Such a rating may be input by a user into IAQ controller 110 via a user interface in a similar manner as input of the size of the indoor space.

Based on the various input values, IAQ controller 110 calculates how long the air sanitization unit 135 and air circulation unit should be operated in sanitization mode to effectively sanitize the indoor air. In an embodiment, a clean air delivery rate (CADR) is calculated based on a flow rate created by the air circulation unit and a sanitizing efficiency of the air sanitization unit 135. The flow rate may be determined by user input, by an air speed (or other flow rate sensor), or other suitable mechanism. The sanitizing efficiency may be particular to a given flow rate and may be determined by user input, by automated lookup based on the determined flow rate, or by another suitable mechanism. In an example embodiment, the flow rate is determined to be 1200 cubic feet per minute (CFM) and the corresponding sanitizing efficiency is determined to be 80% at 1200 CFM. Based on these values, a clear air delivery rate (e.g., the flow rate multiplied by the sanitizing efficiency) of 960 CFM is calculated. How long the air sanitization unit and/or air circulation unit are operated (e.g., the sanitization run-time) is then determined by calculating how long it takes to complete a full air change in the indoor space at the calculated clean air delivery rate. For example, the volume of the indoor space is determined (e.g., by user input or other mechanism) and divided by the clean air delivery rate to determine the sanitization run-time. In alternative embodiments, additional options may be provided to modify the sanitization run-time. For example, a user-selectable option may be presented to increase the number of air changes associated with the sanitization run-time and/or an automated option may increase the number of air changes or sanitization run-time in response to one or more sensor readings (e.g., a sensor reading that shows abnormally poor air quality such as an air quality characteristic that meets or exceeds a threshold associated such a condition).

In response to selection of a sanitization mode (or other trigger), IAQ controller 110 may implement the sanitization mode (e.g., operate the air sanitization unit 135 and air circulation unit) only for a period of time corresponding to the sanitization run-time after which the sanitization mode will be deactivated until triggered again by another user selection of the sanitization mode or another automated trigger as discussed elsewhere in this disclosure.

In alternative embodiments, including in situations where the sanitization mode may be automatically triggered based on sensor data, determination of the sanitization run-time may be automated such that user input is not required. For example, IAQ controller 110 may implement a default sanitization run-time. Still further, one or more air quality sensors 175a . . . x may be used to sense air quality changes during a sanitization mode and may trigger an end to the sanitization mode upon the air quality sensor data reaching a satisfactory air quality threshold. For example, IAQ controller 110 may receive sensor data from one or more air quality sensors 175a . . . x that sense various air quality parameters including occupancy sensors (e.g., motion sensors, carbon dioxide sensors, light sensors, etc.), gas phase sensors (e.g., volatile organic compound sensors), particulate sensors, etc. In response to determining that the sensor data has returned to an acceptable range, IAQ controller 110 may deactivate the sanitization mode. For example, IAQ controller 110 may compare the received sensor data to a corresponding threshold or acceptable range to determine if the sanitization mode should be deactivated. In other examples, IAQ controller 110 may use machine learning or artificial intelligence models to determine a pattern associated with data from one or more sensors that exhibits an acceptable air quality condition such that further air sanitization is no longer needed.

IAQ controller 110 may also implement zone-specific air sanitization control. For example, IAQ controller 110 may coordinate control of the air sanitization unit 135 and the air circulation unit with one or more zone dampers 180a, 180b, . . . 180x such that sanitized air may be directed to one or more particular zones within the indoor space. Such control may be responsive to user inputs received via a user interface of the IAQ controller 110 or a remote connected control device 115. For example, a user may submit an input command that a sanitization mode be activated with respect to specific zones. Alternatively, in a similar manner as described above for automatic sanitization mode activation, zone specific air sanitization could be triggered automatically based on sensor data received from sensors for specific zones. For example, IAQ controller 110 may receive sensor data from an air quality sensor 175*a* . . . *x* that is associated with a particular zone. In response to determining that the sensor data for the zone-specific sensor exhibits an unacceptable air quality condition, IAQ controller 110 may activate the sanitization mode and control associated zone dampers such that sanitized air is directed to the particular zone associated with the unacceptable air quality condition and not directed to other zones that exhibit an acceptable air quality condition.

In alternative embodiments, in response to a sanitization mode trigger, the IAQ controller 110 may control the air sanitization unit 135 in conjunction with the air circulation unit such that the air circulation unit moves air through the ductwork 105 (and past the air sanitization unit 135) at a rate that is higher than its minimum, non-zero rate. For example, the IAQ controller 110 may be programmed with a minimum acceptable air flow rate or speed within the ductwork 105 for acceptable air sanitization. An air flow rate sensor may be located within the ductwork 105 and may communicate air flow rate to the IAQ controller 110. Accordingly, in situations where the air circulation unit is capable of controlling the circulation of air within the ductwork 105 at multiple air flow rates below the minimum acceptable air flow rate, the IAQ controller 110 may choose a flow rate other than its minimum so long as the chosen rate satisfies the minimum acceptable rate for effective sanitization of the air. Still further, the IAQ controller may be programmed with a maximum acceptable air flow rate or speed within the ductwork 105 for acceptable air sanitization. Accordingly, in situations where the air circulation unit is capable of controlling the circulation of air within the ductwork 105 at air flow rates above the maximum acceptable air flow rate, the IAQ controller 110 may choose a flow rate other than its maximum so long as the chosen rate satisfies the maximum acceptable rate for effective sanitization of the air. In choosing the air flow rate according to such an embodiment, the IAQ controller 110 may consider additional factors such as the presence of a heat or cool call that requires a particular fan speed (and thus corresponding flow rate), a number of required air changes for sufficient air sanitization, or other sensor data including humidity level, etc.

For example, in situations where the IAQ controller 110 determines that a particular heat or cool call requires a fan speed greater than a minimum, non-zero air flow rate setting of the air circulation unit (but still below a maximum acceptable air flow rate for sanitization), the IAQ controller 110 may engage the sanitization mode (e.g., activate the air sanitization unit 135) during the heat and cool call despite the fact that the air circulation unit is not operating at its lowest speed/rate. In contrast, should the IAQ controller 110 determine that the air (fan) speed/rate required for the heat or cool call exceeds a maximum acceptable air speed/flow rate for effective sanitization, the IAQ controller 110 may deactivate or delay activation of a sanitization mode until after the heat or cool call is complete, at which time the IAQ controller 110 may activate the sanitization mode.

In another embodiment, the IAQ controller 110 may receive a humidity sensor reading from a communicatively coupled humidity sensor (e.g., sensor 175*a*). It has been found that virus transmission in optimally humidified air is less than in sub-optimally humidified. In an embodiment, optimal humidity may be considered as a humidity reading in the range of 40-60% relative humidity. Accordingly, in response to determining based on the humidity sensor reading that the humidity of the indoor air is within the optimal range, the IAQ controller 110 may cause the air circulation unit to increase the air flow rate so that air sanitization can be accomplished more quickly. This can be accomplished because the reduced virus transmission environment afforded by the optimal humidity level reduces the amount of sanitization effort required to bring the air quality to an acceptable level. Accordingly, in an embodiment, the clean air delivery rate calculation may be further dependent on the humidity range as the relative humidity may be a variable considered when determining the sanitizing efficiency. Conversely, if the humidity level is determined to be outside of a preferred range, the sanitization mode may be modified such that the IAQ controller 110 causes performance of increased air sanitization efforts by the system. For example, the IAQ controller 110 may do one or more of extend the sanitization run-time, further slow the air circulation rate, enhance the air sanitization intensity (e.g., increase the UV-C light intensity), and/or increase ventilation (e.g., increase the amount of outdoor air introduced into the indoor space). Still further, in embodiments of the system that incorporate an evaporative humidifier for humidifying air within the indoor space, the IAQ controller 110 may receive or determine an optimal flow rate for the evaporative humidifier. The IAQ controller 110 may further cause the air circulation unit to control the air flow rate to balance optimization of humidification and air sanitization.

In some embodiments, IAQ controller 110 may utilize an artificial intelligence or machine learning model to optimize the air circulation rate and corresponding air sanitization in optional conjunction with various other air quality or system efficiency considerations. For example, IAQ controller 110 may utilize a neural network (e.g., a convolutional neural network, a deep learning neural network, a recurrent neural network, etc.) for such decision making. In various embodiments, a multi-layer stack of neural network nodes are utilized such that each layer corresponds to different aspects or considerations of the IAQ controller 110 as described above. In alternative embodiments, other suitable artificial intelligence or machine learning model may be used including Bayesian classification methods, kernel methods, pattern recognition methods, and other suitable models.

Such models may be trained by providing repeated input stimuli and then directing the network to provide the correct output. In this way, the model is trained to determine the correct output based on the input stimuli. In an example, training data may include one or more of various air circulation rates, sanitization unit outputs (e.g., UV-C light intensity), UV-C light reflective aspects of the air sanitization unit 135, humidity levels, temperature, air quality data (e.g., VOC levels, particulate levels, etc.), time of year, time of day, size of indoor space, operational characteristics of the air circulation unit (e.g., CFMs), etc. Corresponding outputs of the model may include air sanitizing efficiency, air circulation rate, air sanitization run-time, UV-C light intensity, temperature settings, humidity settings, etc. In converting an input to the desired output the training may comprise supervised learning, non-supervised learning, reinforcement learning or other learning techniques. Supervised learning involves the supervising of target values and parameters. Non-supervised learning attempts to identify patterns in the input that have identifiable structure and can be reproduced without direct supervision. Reinforcement learning works independently (like non-supervised learning) but includes rewards or disincentives based on success or failure.

IAQ controller 110 may also control air sanitization based on occupancy determinations for the indoor space. These occupancy determinations may be based on a user-defined schedule programmed via a user interface of the IAQ controller or of a remote control device 115, geofencing settings (e.g., a determination that a user device is outside of a geofence established a set distance from the structure associated with the indoor space), occupancy sensors (e.g., a motion sensor, a carbon dioxide sensor, etc.), or other known manners of determining occupancy of a structure. In the event that IAQ controller 110 determines a lack of occupancy based on user set occupancy features (e.g., determines that a user device is outside of a geofence) or determines lack of occupancy based on sensor readings from within the indoor space (e.g., lack of motion detected by motion sensor or carbon dioxide readings below a threshold), the IAQ controller 110 may trigger a sanitization mode so that air sanitization efforts can be accomplished during periods of little or no occupancy. In this way, other functions of the HVAC system (e.g., controlling temperature, humidity, etc.) can be prioritized during periods of increased occupancy. In addition, in the event that IAQ controller 110 determines abnormally high occupancy based on occupancy sensor readings or other occupancy determination methods, the IAQ controller 110 may trigger a sanitization mode in order to reduce the risk of air quality degradation (including virus transmission) caused by increased numbers of people within an indoor space.

IAQ controller 110 may also incorporate further features useful in extending the lifetime and reliability of components of the system 100 including the air sanitization unit 135. For example, unusually high or low temperatures may significantly shorten the life span and/or reduce the reliability of UV-C lights (and other air sanitization units). To address this issue, IAQ controller 110 may incorporate a temperature sensor and/or be communicatively coupled to a temperature sensor positioned within the indoor space and/or within the ductwork 105 itself so that the IAQ controller 110 may determine when a temperature proximate the air sanitization unit 135 and/or within the ductwork 105 reaches an unacceptable temperature that could negatively impact the life span or reliability of the air sanitization unit 135 (or other components of the system). The unacceptable temperature may be determined based on manufacturer recommendation operating ranges or based on testing of the device. Determination that the temperature is unacceptable may be made by comparing the temperature sensor readings to a threshold or a range of acceptable temperatures, monitoring temperature patterns over time (e.g., using a machine learning algorithm as discussed elsewhere in this disclosure), or other methods of determining the presence of an unacceptable temperature condition. In response to determining an unacceptable temperature condition, the IAQ controller 110 may deactivate or delay a sanitization mode in order to prolong the life and reliability of the air sanitization unit and/or other components of the system 100. Alternatively or additionally, the IAQ controller 110 may also address such undesirable temperature conditions by modulating the operation of the air sanitization unit 135 (for example, by activating only a subset of UV-C lamps/lights within the air sanitization unit 135 and/or sequentially activating/deactivating individual lamps/lights of the air sanitization unit 135).

In some situations, a heat or cool call for the HVAC system may conflict with a request (manual or automated) to trigger an air sanitization mode. This may occur, for example, where the heat or cool call utilizes an air circulation rate that is inconsistent with effective air sanitization. In such situations, IAQ controller 110 may be configured to normally prioritize (i.e., absent extenuating circumstances) the heat or cool call for the HVAC system. Accordingly, in such situations, the IAQ controller 110 will delay the sanitization mode until the heat or cool call (or other HVAC call) has been completed, after which the sanitization mode may be activated. In other aspects, IAQ controller 110 may configured to override this normal operation in response to an override command received via a user interface or in response to receiving sensor data indicating an extenuating circumstance that requires override of the HVAC call. For example, IAQ controller 110 may have multiple thresholds or ranges to which air quality sensor data is compared. A first threshold, range, or detected pattern may be associated with a condition in which air sanitization is requested by an override of an HVAC all not required. A second threshold, range, or detected pattern may be associated with an override condition in which air sanitization is requested and prioritized over an HVAC call (e.g., heat, cool, humidify, dehumidify, etc.). In still a further aspect, a particular (first, second, or additional) threshold, range, or pattern may be associated with an override-plus condition in which the IAQ controller 110 implements additional ventilation features together with the sanitization mode.

Figure 2:
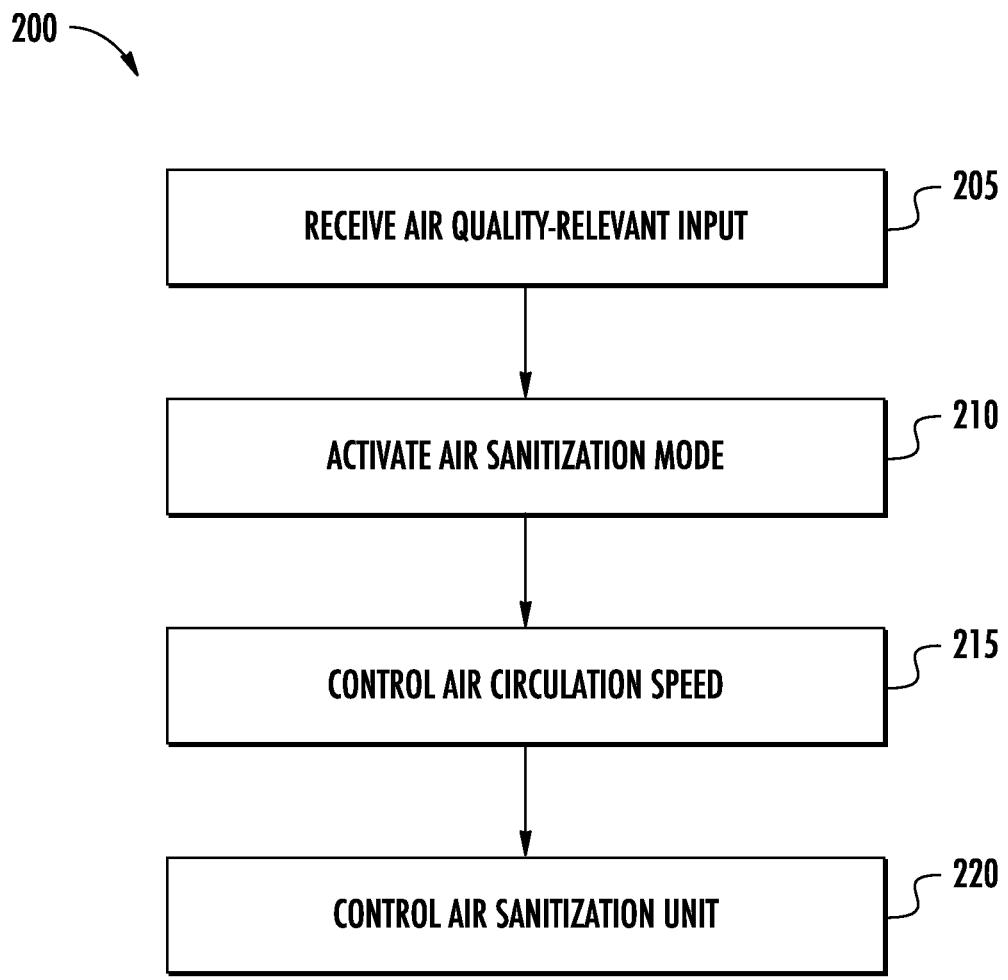
FIG. 2 is a flow diagram illustrating air sanitization operations performed by an HVAC system, according to an exemplary embodiment.

FIG. 2 shows a flow diagram illustrating a method 200 of sanitizing air performed by an HVAC system, according to an exemplary embodiment. In an operation 205, an air quality controller receives one or more air quality-relevant inputs. The air quality-relevant inputs may include user inputs received via a user interface of the air quality controller or a communicatively coupled remote control device. The air quality-relevant inputs may also include one or more sensor readings or inputs from other network-connected or otherwise communicatively coupled system components. Example air quality-relevant inputs include a user input selecting a particular mode associated with air sanitization, user input of information associated with the HVAC system or air sanitization (e.g., size of indoor space, type of HVAC equipment (including furnace, air conditioner, air circulation unit, air sanitization unit, humidifier), characteristics of HVAC equipment (including size, manufacturer, CFM, air filter type, etc.), number of zones, zone sizes, user preferences (including temperature settings, humidity settings, ventilation settings, schedules, geofencing settings, etc.). Air quality-relevant inputs may also include sensor readings such as humidity data, temperature data, carbon dioxide data, motion data, VOC data, particulate data, etc.

In an operation 210, an air quality controller determines that an air sanitization mode should be activated based on the received air quality-relevant input(s). The air quality controller may determine than the air sanitization mode should be activated in response to a manual input from a user, e.g., user selection of a corresponding air sanitization mode input via a use interface. Alternatively, the air quality controller may automatically determine that an air sanitization mode be activated in response to various sensor data. For example, the air quality controller may compare received sensor data indicative of air quality parameters to a value associated with an unacceptable (or acceptable) air quality condition. In response to determining that the sensor data is outside of an acceptable range or is otherwise unacceptable, the air quality controller may trigger the air sanitization mode. In another example, the air quality controller may use machine learning or artificial intelligence models to determine a pattern associated with data from one or more sensors exhibits a need for air sanitization and/or to otherwise determine if an air quality parameter is unacceptable. The air sanitization mode may be automatically triggered in response to such a determination.

In an operation 215, in response to activation of the sanitization mode, the air quality controller instructs an air circulation unit (e.g., a blower fan) to move air through ductwork of an HVAC system at a given air circulation rate such that the air passes an air sanitization unit. In an embodiment, the air quality controller causes the air circulation unit to circulate air at the lowest, non-zero setting of the air circulation unit so as to maximize the time at which the air is within an air sanitization zone affected by the air sanitization unit. In this way, the sanitizing effect of the air sanitization unit on the air is maximized. For example, if a furnace has a blower fan with multiple rates and/or stages, the air quality controller would cause the blower fan to operation at its lowest speed in response to activation of the sanitization mode by the air quality controller.

In alternative embodiments, the air quality controller may control the air circulation unit such that the air circulation unit moves air through the ductwork (and past the air sanitization unit) at a rate that is higher than its minimum, non-zero rate. For example, the air quality controller may be programmed with a minimum acceptable air flow rate for effective air sanitization. An air speed (or other flow rate) sensor may be located within the ductwork and may communicate air speed (or flow rate) to the air quality controller. Accordingly, in situations where the air circulation unit is capable of controlling the circulation of air within the ductwork at multiple flow rates below the minimum acceptable flow rate, the air quality controller may choose a flow rate other than the minimum speed of the air circulation unit so long as the chosen flow rate satisfies the minimum acceptable flow rate for effective sanitization of the air. Determination of the optimal flow rate may be based on the CADR calculations (and further on the associated sanitizing efficiency). In choosing the flow rate according to such an embodiment, the air quality controller may consider additional factors.

In an operation 220, in response to activation of the sanitization mode, the air quality controller activates and controls an air sanitization unit. In an embodiment, operation 220 is performed concurrently with operation 215. To activate the air sanitization, the air quality controller issues a command or signal the air sanitization unit to activate its air sanitization functionality. As an example, activation of the air sanitization unit may include illuminating one or more UV-C lights (e.g., bulbs, LEDs, etc.). In an embodiment, activation of the air sanitization mode is subordinate to HVAC control, i.e., heating, cooling, and ventilation calls are given priority over air sanitization calls.

In further embodiments, operation 220 may include modifying an intensity of the UV-C light emitted from the air sanitization unit or otherwise modifying an intensity of the air sanitization output of the air sanitization unit. For example, where the air sanitization unit includes multiple UV-C bulbs, the air sanitization unit may selectively turn on and off individual UV-C bulbs in response to various inputs so as to optimize the air sanitization output, the life span of the bulbs, and the energy usage of the air sanitization unit. Such control of the air sanitization unit may be coordinated with the air flow rate created by the air circulation unit to meet air sanitization demands according to sensor data (e.g., air quality data, humidity data, indoor space size parameters, etc.) received at the air quality controller.

Figure 3:
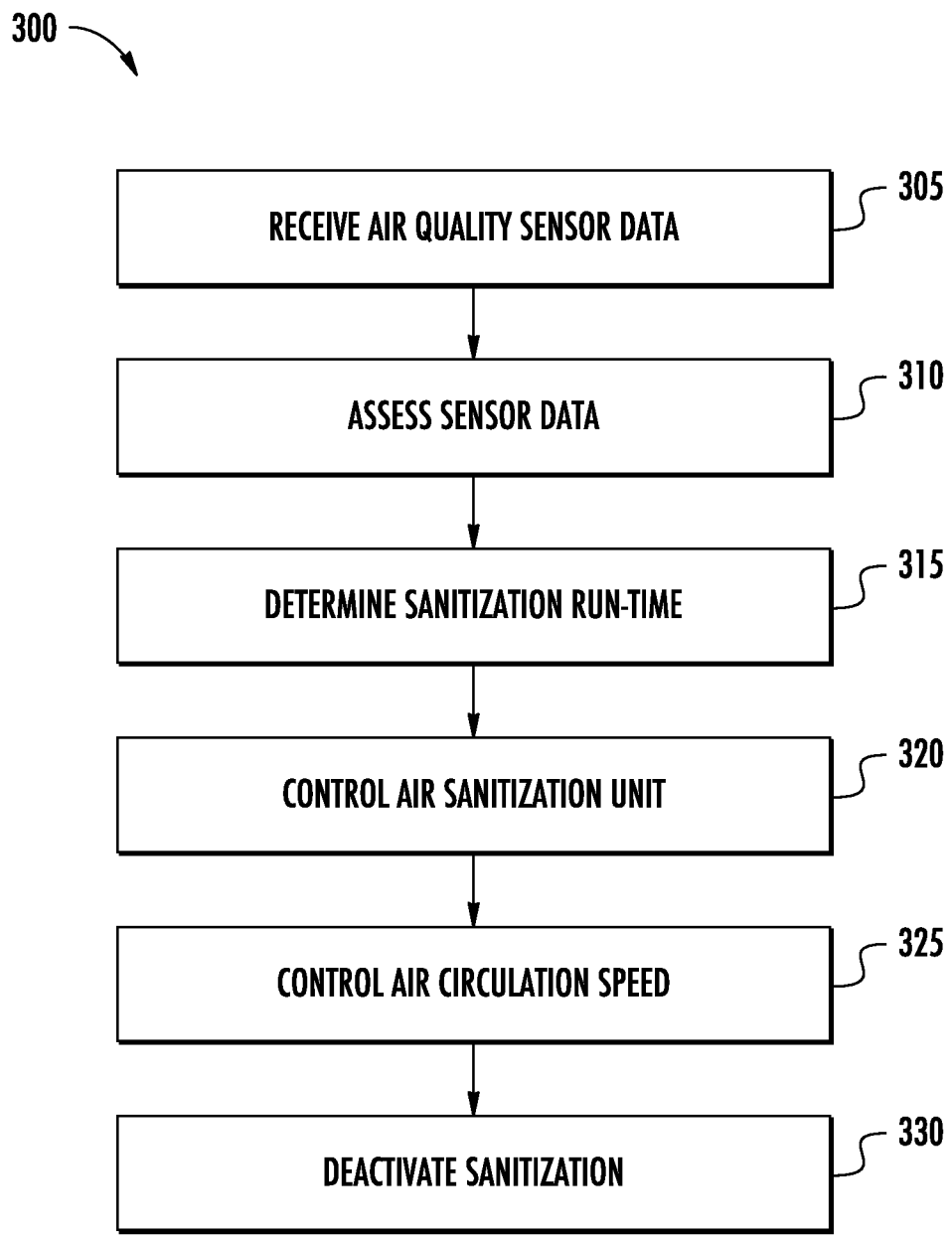
FIG. 3 depicts a flow diagram illustrating air sanitization operations performed by an HVAC system, according to another exemplary embodiment.

FIG. 3 shows a flow diagram illustrating a method 300 of sanitizing air performed by an HVAC system, according to another exemplary embodiment. In an operation 305, an air quality controller receives one or more sensor readings or inputs from network-connected or otherwise communicatively coupled data sensors. Such sensors may include humidity sensors, temperature sensors, occupancy sensors, particulate sensors, VOC sensors, or other air quality sensors. In some embodiments, operation 305 may be performed in a similar manner as operation 205 from FIG. 2 as discussed previously.

In an operation 310, the received sensor data is assessed. For example, the air quality controller may compare the received sensor data to a value or range of values associated with an unacceptable (or acceptable) air quality condition. In another example, the air quality controller may use machine learning or artificial intelligence models to determine that a pattern associated with received sensor data exhibits a need for air sanitization and/or to otherwise determine if an air quality parameter is unacceptable. In response to determining that the received sensor data is outside of an acceptable range or is otherwise unacceptable, the air quality controller may determine the need for air sanitization within the indoor space (or within a particular zone of the indoor space).

In an operation 315, the air quality controller determines a sanitization run-time (e.g., a period of time for which a sanitization mode is to be activated or a sanitization unit operated to sanitize air associated with the indoor space). In one example aspect, the air quality controller calculates the sanitization run-time based on a size of the indoor space and one or more air flow characteristics of the associated HVAC system. The air quality controller may receive a user input indicating the size of the indoor space and may also receive an indication as to the flow rate (e.g., in cubic feet per minute) of the corresponding air circulation unit. In alternative embodiments, the air quality controller may use additional and/or different factors in calculating the sanitization run-time. For example, a filter type for an air cleaner may be considered. A filter having a higher MERV rating will require fewer air changes and a shorter sanitization run-time. Likewise, the air quality controller may consider humidity sensor data and adjust the sanitization run-time based on such data (e.g., increasing the sanitization run-time if the indoor space has a non-optimal humidity, decreasing the sanitization run-time if the indoor space has an optimal humidity, etc.). Based on the various sensor readings (and optionally other values input into the air quality controller), the air quality controller calculates a number of air changes and the sanitization run-time needed to effect the number air changes to effectively sanitize the indoor air.

Still further, the air quality controller may extend the sanitization run-time based on other sensor data. For example, the air quality controller may continually or iteratively compare air quality data received from an air quality sensor to an acceptability threshold and continue air sanitization until the sensor data satisfies the acceptability threshold. As another example, the air quality controller may sample the sensor data as the sanitization run-time nears its end and determine whether to extend the sanitization run-time by a fixed (or variable) amount based on the sensor data (e.g., by comparing the sensor data to an acceptability threshold).

In an operation 320, the air quality controller activates and controls an air sanitization unit. In an embodiment, operation 320 is performed in a similar manner as operation 220 from FIG. 2. To activate the air sanitization, the air quality controller issues a command or signal the air sanitization unit to activate its air sanitization functionality. As an example, activation of the air sanitization unit may include illuminating one or more UV-C lights (e.g., bulbs, LEDs, etc.).

In an operation 325, the air quality controller instructs an air circulation unit (e.g., a blower fan) to move air through ductwork of an HVAC system at a given air circulation rate such that the air passes an air sanitization unit. In an embodiment, operation 325 is performed in a similar manner as operation 215 from FIG. 2. In one aspect, the air quality controller causes the air circulation unit to circulate air at the lowest, non-zero setting of the air circulation unit so as to maximize the time at which the air is within an air sanitization zone affected by the air sanitization unit. In this way, the sanitizing effect of the air sanitization unit on the air is maximized. For example, if a furnace has a blower fan with multiple speeds and/or stages, the air quality controller would cause the blower fan to operation at its lowest speed in response to activation of the sanitization mode by the air quality controller. In other embodiments, the air quality controller may control the air circulation unit such that the air circulation unit moves air through the ductwork (and past the air sanitization unit) at a rate that is higher than its minimum, non-zero rate.

In an operation 330, the air quality controller deactivates the air sanitization mode upon expiration of the sanitization run-time. Deactivation of the air sanitization mode includes instructing the air sanitization unit to turn off and returning control of the air flow rate to normal HVAC operation. Note that returning control of the air flow rate may involve returning a setting for a blower fan (or other air circulation unit) to its setting prior to activation of the air sanitization mode. Alternatively, the air circulation unit may simply be turned off.

Notwithstanding the embodiments described above in FIGS. 1-3, various modifications and inclusions to those embodiments are contemplated and considered within the scope of the present disclosure.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," "communicatively coupled," or "operably coupled," to each other to achieve the desired functionality, and any two components capable of being so associated can also be viewed as being "communicatively coupled" or "operably couplable," to each other to achieve the desired functionality. Specific examples include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Similarly, unless otherwise specified, the phrase "based on" should not be construed in a limiting manner and thus should be understood as "based at least in part on." Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent Moreover, although the figures show a specific order of method operations, the order of the operations may differ from what is depicted. Also, two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection operations, processing operations, comparison operations, and decision operations.

The various models, methods or processes outlined herein may be coded as software that is executable on one or more processors that employ any one of a variety of operating systems or platforms. Such models, methods, or processes may be executed on single local processors or may be executed across a plurality of remotely situated and networked processors (e.g., on the cloud). Additionally, such software may be written using any of a number of suitable programming languages and/or programming or scripting tools, and also may be compiled as executable machine language code or intermediate code that is executed on a framework or virtual machine.

In this respect, embodiments may provide a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be an article of manufacture or a machine and excludes transitory signals.

The operations described in this specification can be implemented as operations performed by a data processing apparatus on data stored on one or more computer-readable storage devices or received from other sources. The term "data processing apparatus," "processor," or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and an I/O device, e.g., a mouse or a touch sensitive screen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTJVIL page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. In some cases, the actions recited herein can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for sanitizing air within an indoor space, the system comprising:
    an air circulation unit configured to move air through ductwork of a heating, ventilation, and air conditioning (HVAC) system;
    an air sanitization unit positioned relative to the ductwork of the HVAC system, wherein the air sanitization unit is configured to sanitize air passing through the ductwork of the HVAC system;
    a sensor communicatively coupled to an indoor air quality controller, wherein the sensor is associated with a first zone of a plurality of zones for the indoor space, and wherein the first sensor is configured to sense data associated with a characteristic of the air within the first zone; and
    the indoor air quality controller communicatively coupled to the air circulation unit and the air sanitization unit, wherein the indoor air quality controller is configured to:
        receive the data associated with the characteristic of the air within the first zone from the sensor;
        compare the data associated with the characteristic of the air within the first zone to a threshold, wherein the threshold is indicative of an undesirable air quality characteristic;
        control a rate at which the air circulation unit moves the air through the ductwork of the HVAC system responsive to one or more inputs received at the indoor air quality controller; and
        based on the comparison of the data associated with the characteristic of the air within the first zone to the threshold, control an operational status of the air sanitization unit according to a determined sanitization run-time associated with the first zone, wherein the determined sanitization run-time associated with the first zone is different from a sanitization run-time associated with a second zone of the plurality of zones.

2. The system of claim 1, further comprising a user input device configured to receive a sanitization mode selection from a user, wherein the indoor air quality controller is further configured to:

change the rate at which the air circulation unit moves the air through the ductwork of the HVAC system to a minimum, non-zero rate of the air circulation unit; and activate the air sanitization unit.

3. The system of claim 1, further comprising a sensor communicatively coupled to the indoor air quality controller, wherein the sensor is configured to sense data associated with a characteristic of the air within the indoor space, wherein the indoor air quality controller is configured to:
receive the data associated with the characteristic of the air within the indoor space from the sensor;
compare the data associated with the characteristic of the air to a threshold, wherein the threshold is indicative of an undesirable air quality characteristic;
based on the comparison of the data associated with the characteristic of the air to the threshold, modify the rate at which the air circulation unit moves the air through the ductwork of the HVAC system and activate the air sanitization unit.

4. The system of claim 1, wherein the indoor air quality controller is further configured to:
receive a user input indicating a size of the indoor space;
determine a number of air changes for adequate sanitization of the indoor space based on the size of the indoor space;
determine a sanitization run-time for the air sanitization unit based on the determined number of air changes and the rate at which the air circulation unit moves the air through the ductwork; and
control operation of the air sanitization unit and the air circulation unit according to the determined sanitization run-time.

5. The system of claim 4, further comprising a humidity sensor communicatively coupled to the indoor air quality controller, wherein the humidity sensor is configured to detect a humidity of the air within the indoor space, and wherein the indoor air quality controller is configured to:
modify the number of air changes for adequate sanitization based on the detected humidity; and
determine the sanitization run-time based on the modified number of air changes.

6. The system of claim 4, further comprising a temperature sensor communicatively coupled to the indoor air quality controller, wherein the temperature sensor is configured to detect a temperature of the air within the indoor space, and wherein the indoor air quality controller is configured to:
modify the number of air changes for adequate sanitization based on the detected temperature; and
determine the sanitization run-time based on the modified number of air changes.

7. The system of claim 4, wherein the indoor air quality controller is configured to:
determine an amount of ventilation for the indoor space;
modify the number of air changes for adequate sanitization based on the determined amount of ventilation; and
determine the sanitization run-time based on the modified number of air changes.

8. The system of claim 1, wherein the indoor air quality controller is configured to:
receive a user input indicating a size of each zone of the plurality of zones in the indoor space;
determine a number of air changes for adequate sanitization of the first zone based on the size of the first zone; and
determine the determined sanitization run-time for the air sanitization unit based on the determined number of air changes and the rate at which the air circulation unit moves the air through the ductwork.

9. A system for sanitizing air within an indoor space, the system comprising:
an air circulation unit configured to move air through ductwork of a heating, ventilation, and air conditioning (HVAC) system;
an air sanitization unit positioned relative to the ductwork of the HVAC system, wherein the air sanitization unit is configured to sanitize air passing through the ductwork of the HVAC system; and
an indoor air quality controller communicatively coupled to the air circulation unit and the air sanitization unit, wherein the indoor air quality controller is configured to:
control a rate at which the air circulation unit moves the air through the ductwork of the HVAC system responsive to one or more inputs received at the indoor air quality controller; and
control an operational status of the air sanitization unit responsive to the one or more inputs received at the indoor air quality controller; and
a flow rate sensor positioned within the ductwork and configured to sense a rate of the air within the ductwork,
wherein the indoor air quality controller is further receive the sensed rate of the air from the flow rate sensor and modify a sanitization time period during which the air sanitization unit is activated based on the sensed rate of the air.

10. The system of claim 1, further comprising an occupancy sensor communicatively coupled to the indoor air quality controller, wherein the sensor is configured to sense occupancy data indicating a presence of an occupant within the home, and wherein the indoor air quality controller is configured to modify the rate at which the air circulation unit moves the air through the ductwork of the HVAC system and activate the air sanitization unit in response to the sensed occupancy data.

11. The system of claim 1, further comprising a temperature sensor communicatively coupled to the indoor air quality controller, wherein the temperature sensor is configured to detect a temperature of the air proximate the air sanitization unit, and wherein the indoor air quality controller is configured to:
compare the detected temperature to a threshold temperature; and
in response to the detected temperature satisfying the threshold temperature, deactivating the air sanitization unit.

12. The system of claim 1, wherein the indoor air quality controller is further configured to:
determine a call has been issued for the HVAC system with which an increased air circulation rate is associated; and
deactivate the air sanitization unit responsive to the call.

13. A method for controlling air quality within an indoor space, the method comprising:
receiving, by an indoor air quality controller, a selection of a sanitization mode;
receiving, by the indoor air quality controller, data associated with a characteristic of air within a first zone from a sensor;
compare the data associated with the characteristic of the air within the first zone to a threshold, wherein the threshold is indicative of an undesirable air quality characteristic;

in response to the selection of the sanitization mode, controlling, by the indoor air quality controller, a rate at which an air circulation unit moves air through ductwork of a heating, ventilation, and air conditioning (HVAC) system; and in response to the selection of the sanitization mode and based on the comparison of the data associated with the characteristic of the air within the first zone to the threshold, controlling, by the indoor air quality controller, an operational status of an air sanitization unit according to a determined sanitization run-time associated with the first zone in conjunction with the controlled rate of the air through the ductwork, wherein the determined sanitization run-time associated with the first zone is different from a sanitization run-time associated with a second zone of the plurality of zones, and wherein the air sanitization unit is located within or adjacent to the ductwork of the HVAC system.

14. The method of claim 13, wherein controlling the rate comprises changing the rate at which the air circulation unit moves the air through the ductwork of the HVAC system to a minimum, non-zero rate of the air circulation unit, and wherein controlling the operational status of the air sanitization unit comprises activating the air sanitization unit.

15. The method of claim 13, further comprising:
receiving, from a sensor, data associated with a characteristic of the air within the indoor space;
comparing the data associated with the characteristic of the air to a threshold, wherein the threshold is indicative of an undesirable air quality characteristic; and
based on the comparison of the data associated with the characteristic of the air to the threshold, modifying the rate at which the air circulation unit moves the air through the ductwork of the HVAC system and activating the air sanitization unit.

16. The method of claim 13, further comprising:
receiving a user input indicating a size of the indoor space;
determining a number of air changes for adequate sanitization of the indoor space based on the size of the indoor space;
determining a sanitization run-time for the air sanitization unit based on the determined number of air changes and the rate at which the air circulation unit moves the air through the ductwork; and
controlling operation of the air sanitization unit and the air circulation unit according to the determined sanitization run-time.

17. The method of claim 16, further comprising:
receiving humidity data from a humidity sensor;
modifying the number of air changes for adequate sanitization based on the detected humidity; and
determining the sanitization run-time based on the modified number of air changes.

18. The method of claim 16, further comprising:
determining an amount of ventilation for the indoor space;
modifying the number of air changes for adequate sanitization based on the determined amount of ventilation; and
determining the sanitization run-time based on the modified number of air changes.

19. The method of claim 13, further comprising:
receiving, from an occupancy sensor, occupancy data indicating a presence of an occupant within the indoor space; and
in response to the received occupancy data, modifying the rate at which the air circulation unit moves the air through the ductwork of the HVAC system and activating the air sanitization unit.

* * * * *